United States Patent [11] 3,562,434

[72] Inventors Kazuya Ohzeki; Kimizo Shirabe; Haruo Mochizuki, Tokyo, Japan
[21] Appl. No. 717,771
[22] Filed Apr. 1, 1968
[45] Patented Feb. 9, 1971
[73] Assignee Nippon Electric Company, Limited Tokyo, Japan
[32] Priority Mar. 31, 1967
[33] Japan
[31] 42/19877

[54] INTER-OFFICE SIGNALING SYSTEM EMPLOYING SELECTED ONES OF THE TOUCH-TONE TELEPHONE FREQUENCIES FOR ESTABLISHING INTER-OFFICE CONNECTIONS
3 Claims, 4 Drawing Figs.

[52] U.S. Cl. .......... 179/16,- 179/84(VF)
[51] Int. Cl. .......... H04q 1/45, H04m 7/00
[50] Field of Search .......... 179/18 (TRK), 16.09, 16.09 (A), 27.4, 43, 84 (VF), 18.81 (Cursory), 18.8 (Cursory), 18 (Reg) (Cursory)

[56] References Cited
UNITED STATES PATENTS

| | | | |
|---|---|---|---|
| 2,761,901 | 9/1956 | Lundkvist | 179/16(.09A) |
| 2,423,084 | 7/1947 | Hertog et al. | 179/16(.09) |
| 2,421,169 | 5/1947 | Taylor et al. | 179/16(.09) |

*Primary Examiner*—Kathleen H. Claffy
*Assistant Examiner*—Thomas W. Brown
*Attorney*—Ostrolenk, Faber, Gerb & Soffen

ABSTRACT: A system for providing inter-office connections as may be necessary to couple calling and called parties within a telephone network employing multifrequency signals of the Touch-Tone telephone type wherein the multifrequency signals employed to establish inter-office connections are identical with selected ones of the multifrequency signals generated by the Touch-Tone type telephone handsets to eliminate the need for frequency conversion operations and additional receivers for handling all operating frequencies and further allowing register circuits at the office of the called subscriber to remain on line until a connection is established or until any other operating function is completed.

INVENTORS
KAZUYA OHZEKI
KIMIZO SHIRABE
HARUO MOCHIZUKI
BY
OSTROLENK, FABER, GERB & SOFFEN
ATTORNEYS

INTER-OFFICE SIGNALING SYSTEM EMPLOYING SELECTED ONES OF THE TOUCH-TONE TELEPHONE FREQUENCIES FOR ESTABLISHING INTER-OFFICE CONNECTIONS

The present invention relates to telephone networks and more particularly to interoffice telephone equipment employing handsets of the touch Touch-Tone telephone type wherein the multifrequency signals employed for establishing connections between offices are coincident with the multifrequency signals of the Touch-Tone type telephone allowing the multifrequency receivers within the office of the called part of to be directly controlled by the Touch-Tone Type type telephone equipment so as to further expand services between the offices within the network while at the same time reducing the amount of equipment necessary to perform such services.

Interoffice connections are established in conventional exchange networks through the employment of registers which develop register signals consisting of a group of frequencies in the audio band, each signal being formed by a combination of 2 frequencies selected from the well-known groups group of 6 frequencies which are 0.7KC, 0.9KC, 1.1KC, 1.3KC and 1.5KC. With the advent of Touch-Tone type telephones being integrated into such telephone networks as terminal equipment for use by the telephone subscriber, it is necessary to provide means for frequency conversion between a register and a sender in the originating exchange because the frequencies employed as selection signals in the Touch-Tone type telephone and the frequencies of the multifrequency signal group employed in establishing interoffice connections are different from one another. It is therefore impossible in accordance with conventional techniques to allow the Touch-Tone type telephone of the originating telephone exchange to directly control the register of the terminating station without the aid of a register and sender at the originating exchange. Furthermore, there is an additional defect in that each exchange must be provided with at least two types of multifrequency receivers, one being for Touch-Tone type telephones and the other for interoffice connections.

The primary object of the present invention is to eliminate the defects of conventional systems by making the frequencies within the group of multifrequency signals used for interoffice connections coincident with the frequencies employed for Touch-Tone type telephones and for further setting both of the groups of frequencies of a suitable level so that the number of multifrequency receivers employed within the telephone network can be reduced and further so that the interoffice signaling system will be capable of allowing a multifrequency receiver within the register of a terminating exchange to be directly controlled by the Touch-Tone type telephone of the originating exchange in order to offer expanded services between exchanges within a network.

The network may typically be comprised of two or more exchanges each of which services a large group of subscribers having Touch-Tone type telephones as their terminating equipment. The Touch-Tone type telephones are activated in order to establish a connection with a called party, causing a register to initiate the establishment of a connection with the exchange of the called party. The register establishes a connection within the exchange switch matrix frame. Once established, a sender within the exchange of the calling party is coupled through a switch frame within the exchange of the called party to a register. The multifrequency signals which are transmitted are made coincident with the multifrequency signals of the Touch-Tone type telephone, thereby operating a register within the exchange of the called party to establish a line to the subscriber which has been designated as the called party. The receiver at the exchange of the called party may then remain on line until the connection is completed or until other functions are performed at which time the receiver of the exchange servicing the called party may then be released. This arrangement eliminates the need for frequency conversion at the exchange servicing the calling party as well as eliminating the need for at least two types of receivers at the exchange servicing the called party enabling the connection to be established directly under control of the Touch-Tone type telephone and thereby providing for expanded services between offices.

It is therefore one object of the present invention to provide novel station connection establishing equipment employing sending facilities utilizing multifrequency signals which are coincident with the multifrequency signals of the terminating equipment provided for each subscriber, thereby eliminating the need for frequency conversion operations as well as eliminating the need for multiple types of receivers at each exchange.

These as well as other objects of the present invention will become apparent when reading the accompanying description and drawings in which:

FIG. 1 shows a conventional telephone network for establishing interoffice connections in which Touch-Tone type telephones are employed as the network terminating equipment and further showing the registers for generating register signals utilized for interoffice connections, which signals are taken form from a group of multifrequency signals preferably in the audiofrequency range.

Figure 1:
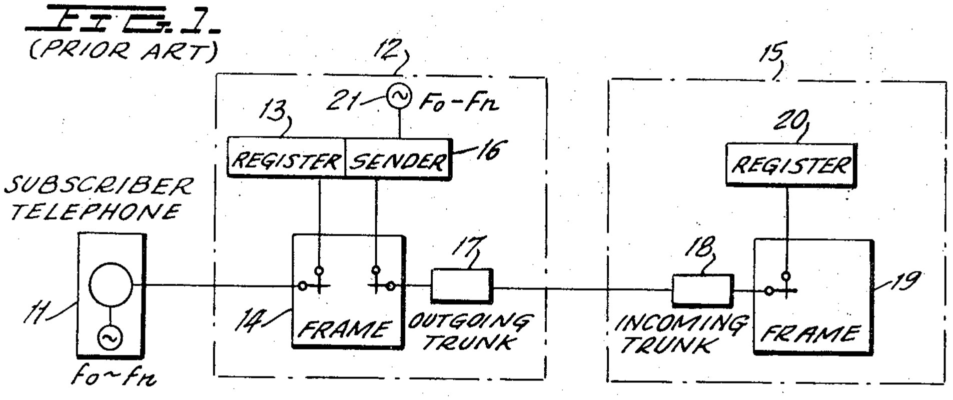
FIG. 1. (PRIOR ART)
FIG. 1 is a block diagram showing the operating principles of a conventional interoffice connection system employing Touch-Tone type telephones as the terminating equipment and incorporating register signaling equipment for establishing the interoffice connections.

When a telephone 11 os of the Touch-Tone type (for a subscriber A, for example) has been connected to a common control type automatic exchange of an exchange 12, as a result of lifting or removing the receiver (not shown) to make an originating call, a register 13 is actuated causing the automatic exchange 12 to initiate the establishment of an originating call connection. Register 13 receives the called party selection signal which causes the register to operate switch matrix 14 to make an outgoing connection so that a common control type automatic exchange 15 is actuated through register 13 as a result of the register 13 activating a sending circuit 16 which transmits its signals through switch matrix 14, outgoing trunk 17, incoming trunk 18 and switch matrix 19, whereupon the signals are applied to a register 20 provided within the exchange servicing the called party (not shown).

In the arrangement of FIG. 1 the code of the called party transmitted from telephone subscriber 11 is comprised of a group of selection signals which are multifrequency signals $f_0$–$f_n$. These multifrequency signals are temporarily stored in register 13 after which they undergo conversion into the multifrequency signals of the selection signal group $F_o$–$F_n$ which are employed for establishing interoffice connections from the sender 11 to the exchange 15 once the exchange 15 has been actuated and which are different from the signals $f_o$–$f_n$. The converted signals are then transmitted to the multifrequency receiver provided within register 20 at exchange 15. It can clearly be seen that in the conventional system the selection signal transmitted from the Touch-Tone telephone (11, for example) must first be subjected to a frequency conversion operation between the register 13 and the sender 16 at the originating exchange before the actual connection may be established.

Figure 2:
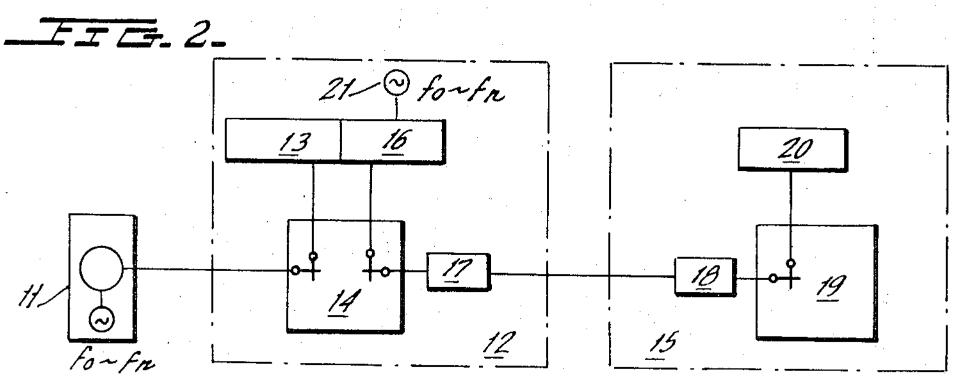
FIG. 2 is a block diagram showing the operating principles of a telephone network designed in accordance with the present invention.

FIG. 2 is a block diagram showing one preferred embodiment of the interoffice connecting equipment employing the principles of the present invention, wherein like elements are designated by like reference numerals with reference to FIG. 1. In FIG. 2 the frequencies developed by frequency generator 21 are identical to selected ones of the multifrequency selection signals $f_0$–$f_n$ developed by Touch-Tone type telephone. The levels of the multifrequency signals generated by both the subscriber terminating equipment 11 and the sending equipment 16 are set so that the multifrequency receiver provided in register 20 of exchange 15 is capable of receiving the signals from both the telephone terminating equipment 11 and the sender circuit 16. The interoffice connections however are made in a manner similar to that described above with any exceptions being detailed below.

Figure 3:
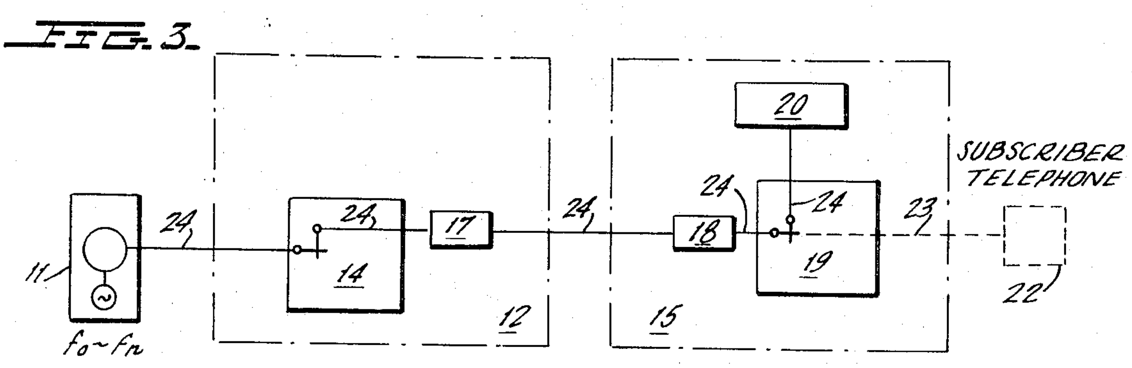
FIG. 3 is a block diagram showing the operating principles of one embodiment of the interoffice connection system employing the principles of the present invention and showing the connections between calling and called parties.

FIG. 3 is a block diagram showing the operating principles of the present invention and is based upon the principles described with reference to FIG. 2 which offers new services to the interoffice connection capability. When the connection sequence between the two exchanges 12 and 15 advances to the stage wherein the frequency selection signals have been transmitted from the sending circuit 16 of exchange 12 to the register 20 of exchange 15 and when the register 13 and sender 16 of exchange 12 have been released, the condition of the circuitry within the network is as shown in FIG. 3. In conventional switching systems, register 20 of exchange 15 is also released after having transferred the called party information, as well as other information to a marker circuit (not shown) and the connection to the called party terminating equipment 22 is established as shown by the dotted line 23.

Figure 4:
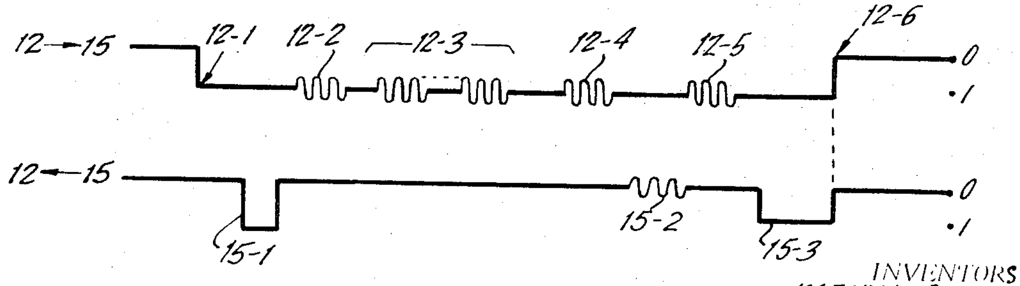
FIG. 4 is a waveform diagram showing the signals employed in the interoffice connection system of FIGS. 2 and 3.

In accordance with the present invention, as one example, the signaling frequencies, to be described hereinbelow with reference to FIG. 4, are employed so as to hold the register circuit 20 on line. In this manner, the multifrequency signals within the group $f_0$–$f_n$ can be directly transmitted to the multifrequency receiver provided within register 20 by means of the connection line 24 as shown in solid line fashion, which extends from the calling party terminating equipment 11, frame 14, outgoing trunk 17, incoming trunk 18, matrix 19 and register 20. By providing this arrangement the condition that the called party is busy, for example, may be transmitted using the multifrequency signals by suitably constructing the code which also further allows instructions such as offering connection, forced release, etc. to be transmitted in a similar manner. Such instructions can be transferred from the register 20 to the marker circuit (not shown) in a well-known manner so that all instructions may be carried out in routine fashion. In order to release the register 20 which has been held to this point, a method for automatically releasing the register responsive to its connection condition or responsive to a method of transmitting On and Off signals using the multifrequency signals in group $f_0$–$f_n$ can be employed. In the description given hereinabove, the connection has been shown as being established between two exchanges 12 and 15. However, it should be clearly understood that the present invention is also applicable in cases where a plurality of repeater stations or switching offices are interposed between the originating and terminating exchanges.

FIG. 4 shows waveforms generated in one preferred embodiment of the present invention, for example, as shown in FIGS. 2 and 3, which signals are generated at a various stages in the establishment of the interoffice connection between exchanges 12 and 15. In FIG. 4 the symbol → represents the direction of signals to be sent from the originating exchange 12 to the terminating exchange 15 while the symbol ← represents the direction of signals transmitted from the exchange 15 to the exchange 12. The signal waveform shown by the straight line designates the line signal with 0 indicating the normal state and with 1 indicating the actuation state. The waveforms shown in FIG. 4 indicate the transmission of multifrequency signals. 12–1 indicates the generation of an actuating signal to actuate exchange 15 and to block the trunk; 12–2 represents a class signal which indicates the class or category of the calling party; 12–3 is comprised of a plurality of waveforms of frequencies lying within the group of frequencies $f_0$–$f_n$ which are employed in predetermined combinations as a selection signal; 12–4 represents one of the multifrequency signals which is employed to indicate the termination of a selection signal. All of these signals 12–1 through 12–4 are transmitted from the sending circuit 16 in exchange 12 and are received by the register circuit 20 in exchange 15. 12–5 represents a multifrequency signal employed as an instruction signal for offering connection, forced release, etc., which signal is transmitted directly from the calling party (i.e. the Touch-Tone type telephone). 12–6 represents the release signal which indicates the termination of the conversation link which, in turn, releases the connecting trunk to its normal state.

In the 12 15 direction: 15–1 represents the signal transmitted from exchange 15 which designates a connection confirming signal confirming that the register 20 of exchange 15 has been seized by the actuating signal 12–1; 15–2 represents one of the multifrequency signals which is sent to the calling exchange to represent information regarding the state of the terminating exchange 15; and 15–3 represents the answering signal from the called party. As can clearly be seen from FIG. 4, the group of multifrequency signals $f_0$–$f_n$ are employed as the multifrequency signals incorporated within the groups 12–2, 12–3, 12–4, 12–5 and 15–2, so that it is now possible to directly control the register 20 of the terminating exchange 15 from the calling party terminating equipment 11 (i.e. the Touch-Tone type telephone, for example) to make the above described offering connection, forced release, etc.

It is obvious that the frequency compositions of the multifrequency group $f_0$–$f_n$ are determined by the frequencies generated by the Touch-Tone type telephones used within the system. The Touch-Tone type telephones now being used and commonly referred to as the four-by-four system employed in accordance with international standards, are caused to generate frequencies within the group $f_0$–$f_n$ which are further comprised of X and Y codes in addition to the numerical code 0—9, as shown in the chart below.

| | Numerical codes | | Numerical codes | |
|---|---|---|---|---|
| ($f_0$–$f_n$) c/s | | | | |
| 697 | 1 | 2 | 3 | Reserve. |
| 770 | 4 | 5 | 6 | Do. |
| 852 | 7 | 8 | 9 | Do. |
| 941 | X | 0 | Y | Do. |
| c/s ($f_0$–$f_n$) | 1,209 | 1,336 | 1,477 | (1,633). |

It can clearly be seen from the above chart that by mixing or combining any of the forced frequencies lying in the horizontal row with any of the 4 frequencies lying in the vertical column that as many as 16 combinations may be formed. Four of the 16 combinations have been reserved for future use.

As described above, in accordance with the interoffice signaling system of the present invention economy of multifrequency receivers can be achieved due to the fact that the receivers required in the network can be used in common for both calling information and interoffice connections and a calling telephone can thereby directly transmit instruction signals to a terminating exchange thereby enabling various new interoffice connection services such as offering connection, forced release, etc., to be achieved in combination with the prior art capabilities of a telephone exchange.

Although there has been described a preferred embodiment of this novel invention, many variations and modifications will now be apparent to those skilled in the art. Therefore, this invention is to be limited, not by the specific disclosure herein, but only by the appending claims.

We claim:

1. An interoffice signaling network comprised of a plurality of offices which include means for establishing connections to subscribers serviced by the offices as well as connections with other offices in the network, wherein the terminating equipment for each subscriber is comprised of Touch-Tone type telephones capable of generating a plurality of signals of predetermined frequencies wherein said signals all lie within a predetermined frequency range:

each of said offices being comprised of outgoing trunks, incoming trunks and a switch matrix for establishing connections between a subscriber telephone and an outgoing trunk and for establishing connections between a called telephone and an incoming trunk;

a register for receiving selection signals from a calling subscriber serviced by the office of said calling subscriber to establish a connection with the appropriate office servicing the called subscriber;

a sending circuit in each office for transmitting selection signals to the office servicing the called subscriber, said sending circuit being adapted to generate a plurality of signals which are identical to selected ones of the signals capable of being generated of said Touch-Tone telephones;

a receiving register in each office for receiving selection signals to operate the switch matrix of its associated office to establish the telephone link with the desired called subscriber.

2. The network of claim 1 wherein said receiving register includes means for maintaining the register on line until released by a signal indicating that the connection has been established with the calling subscriber.

3. The network of claim 1 wherein the register of each office which is the terminating station for a telephone link is directly controlled by the Touch-Tone telephone of an originating station under control of the multifrequency signals generated by the Touch-Tone telephone initiating the call.